United States Patent
Jimenez Alamo

(10) Patent No.: US 8,561,884 B2
(45) Date of Patent: Oct. 22, 2013

(54) MULTI-COMMUNICATION ASSISTED PORTABLE TERMINAL

(75) Inventor: Antonio Jimenez Alamo, Alcala de Henares (ES)

(73) Assignees: Intelligent Data, S.L. (ES); Sociedad Anonima Espanola de Tarjetas de Identification y Credito (ES)

( * ) Notice: Subject to any disclaimer, the term of this patent is extended or adjusted under 35 U.S.C. 154(b) by 0 days.

(21) Appl. No.: 13/588,143

(22) Filed: Aug. 17, 2012

(65) Prior Publication Data

US 2013/0098987 A1  Apr. 25, 2013

(30) Foreign Application Priority Data

Oct. 20, 2011 (ES) .................................. 201131687

(51) Int. Cl.
*G06F 17/00* (2006.01)
(52) U.S. Cl.
USPC ........................................................ 235/375
(58) Field of Classification Search
USPC .............. 235/379, 376, 380, 375; 705/16, 24, 705/27.1
See application file for complete search history.

(56) References Cited

U.S. PATENT DOCUMENTS

| | | | |
|---|---|---|---|
| 6,327,575 B1 * | 12/2001 | Katz | 705/16 |
| 7,600,673 B2 * | 10/2009 | Stoutenburg et al. | 235/380 |
| 2006/0172266 A1 * | 8/2006 | Rogers et al. | 434/112 |
| 2006/0181515 A1 * | 8/2006 | Fletcher et al. | 345/173 |
| 2009/0145958 A1 * | 6/2009 | Stoutenburg et al. | 235/376 |
| 2010/0317371 A1 * | 12/2010 | Westerinen et al. | 455/456.6 |
| 2011/0184824 A1 * | 7/2011 | George et al. | 705/24 |
| 2011/0187642 A1 * | 8/2011 | Faith et al. | 345/158 |

* cited by examiner

Primary Examiner — Daniel Hess
Assistant Examiner — Steven J Malone
(74) Attorney, Agent, or Firm — Ostrolenk Faber LLP

(57) ABSTRACT

The device of the invention, starting from the conventional structure of these types of terminals, combines a great variety of peripherals therein, which makes it extremely versatile as well as suitable to use by people with physical disabilities, with an ergonomic and strong design that allows multiple transactions possibilities, multiple communication possibilities, emitting voice messages corresponding to transactions carried out, all these with a high brightness screen, a keypad with Braille reliefs and a joystick to operate the device, also having a scanner and an opening mechanism for the printer cover which prevents it from opening accidentally.

6 Claims, 2 Drawing Sheets

MULTI-COMMUNICATION ASSISTED PORTABLE TERMINAL

OBJECT OF THE INVENTION

The present invention relates to a multi-communication assisted portable terminal, of the type used in management tasks of a retail business.

The object of the invention is to provide a robust, ergonomic point-of-sale terminal, of great durability and adaptable to people with physical disabilities.

BACKGROUND OF THE INVENTION

In the practical application scope of the invention, there are a large number of known devices or point-of-sale terminals, through which a retail business allows making the payment process easier by allowing clients to pay using a credit card.

This type of devices presents some problems which focus fundamentally in the following aspects:
- These devices are fragile, so that accidentally dropping them may cause them to break.
- They are not suitable for use by people with physical disabilities.
- It is usual for the paper access case to accidentally disengage.
- Given its structure, the width of the paper used is greatly limited.
- They have a high volumetry and a considerable weight.
- They have reduced autonomy.

DESCRIPTION OF THE INVENTION

The terminal that is recommended has been designed to solve the aforementioned problems in each and every of the aspects discussed.

Therefore, based on the conventional internal structure of this type of devices, in which there is a power supply that feeds a microprocessor, associated to a card reader and equipped with a communications module, either wired or wireless, to establish communication with the corresponding banking company, the invention provides, as one of the multiple novelties, the fact of incorporating a touch screen with high brightness VGA resolution, whereby the representation of images, icons, and the like is possible, facilitating the use of the terminal.

According to another of the characteristics of the invention, the device incorporates a keypad with a joystick, which facilitates navigation, incorporating contextual operation keys, and reliefs in Braille.

Another novel characteristic consists in the incorporation of a large format printer in the device that allows a paper width of 80 mm, with capacity to print EAN 128 of 28-digit codes, allowing use of both 80 mm and 58 mm rolls.

Besides, the terminal is provided to incorporate a high resolution image scanner through which it is possible to capture images, as well as to read one and two dimension codes, bet capture, etc.

In regards to the means of payment, the device is equipped with magnetic stripe card readers, chip cards or "smart card", as well as RFID cards (NFC), compatible EMV and PCI.

In accordance with another feature of the invention, It is anticipated that the point-of-sale terminal incorporates a high-quality audio circuit, with built in microphone, a circuit that, through the corresponding software allows listening, through audio (voice) signals, to operations that are being carried out which is ideal for people with visual disabilities.

As for the wireless/wired media, it is envisaged that the device incorporates GSM/GPRS technology, GPS, WIFI, Bluetooth, and LAN/Ethernet.

Externally, it is anticipated that the device is integrated into an ergonomic case, of small dimensions, incorporating rubber inserts in the critical areas, which protect the device from impacts, incorporating on its lower face, shoulder strap reinforced attaching means.

Thus, an extremely versatile point-of-sale terminal is achieved, with a great variety of peripherals installed therein in a minimum space, which facilitates all the necessary services for the comfortable and efficient development of the daily activities of the logistics sale personnel, all these with a great durability achieved by means of a ruggedized finish, a robust design, and special ergonomics, thought for prolonged used both in the exterior and the interior.

DESCRIPTION OF THE DRAWINGS

To complement the description being made and in order to help better understand the features of the invention, according to a preferred practical embodiment thereof, a set of drawings is attached as an integral part of said description, wherein the following is shown as way of illustration but not limited to.

PREFERRED EMBODIMENT OF THE INVENTION

Figure 1:
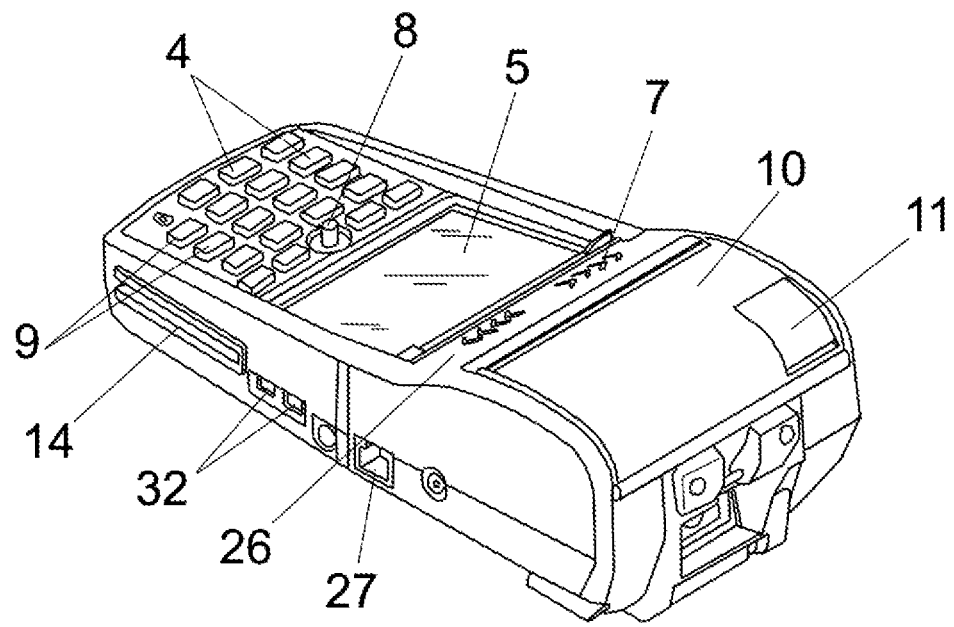
FIG. 1. Shows an upper-lateral perspective view of a multi-communication assisted portable terminal carried out in accordance with the object of the present invention.
Figure 2:
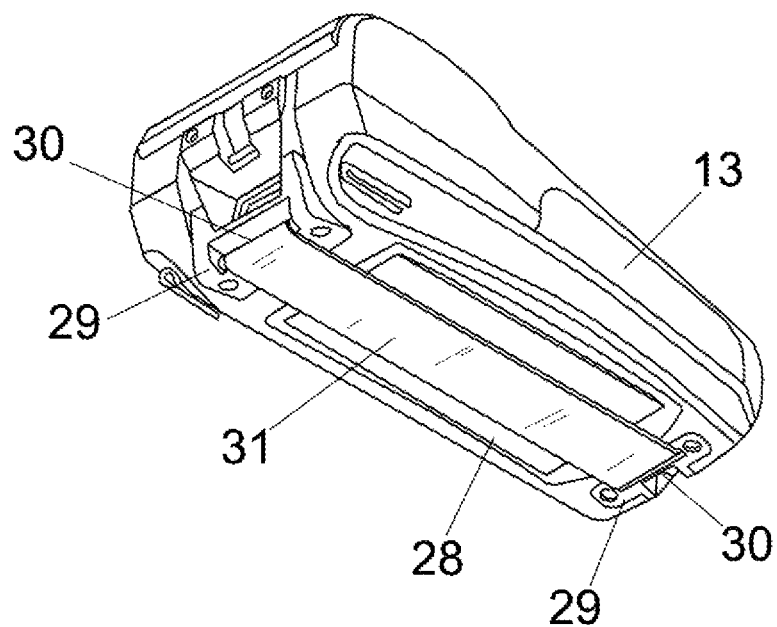
FIG. 2. Shows a lower-lateral perspective view of the device of the previous figure.
Figure 3:
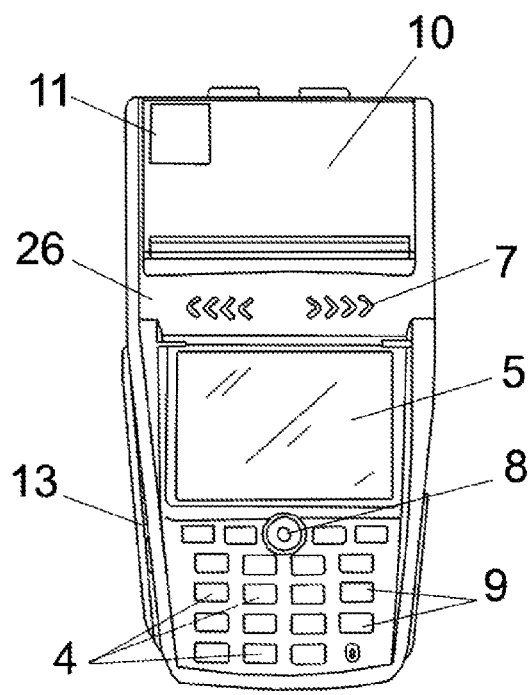
FIG. 3. Shows a plan view of the device of the previous figures.
Figure 4:
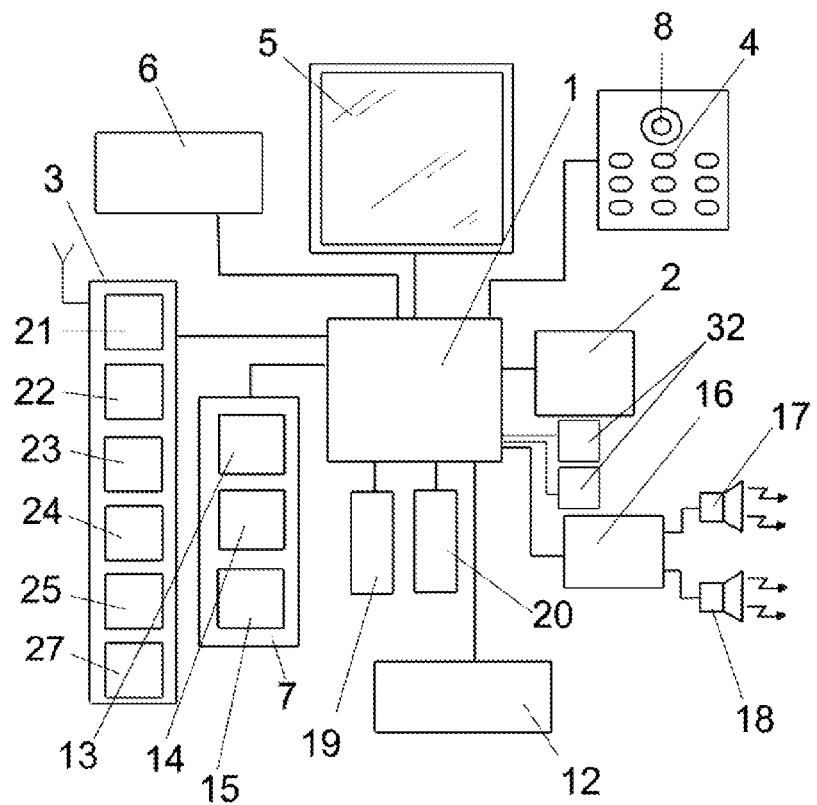
FIG. 4. Shows a schematic diagram of the various peripherals and elements that participate in the internal structure of the device.

In view of the above-mentioned figures, and especially FIG. 4, it can be observed how the multi-communication assisted portable terminal that is recommended is made, as it is conventional, from a microprocessor (1), associated to a power supply (2), a processor that has a communication module (3), a keypad (4), a screen (5), a printer (6), and means for reading banking cards (7).

Therefore, according to the invention, it is provided that the screen (5) is a touch screen with high brightness VGA colour resolution through which the representation of images, icons and the like that facilitate the use of the terminal, is allowed.

In turn, the keypad (4) has a numerical keyboard with Braille reliefs, incorporating a joystick (8) for navigation, and contextual operation keys (9).

The printer (6) has a 80 mm paper roll, that allows for 58 and 80 mm width rolls with capacity to print EAN 128 of 28-digit codes, its cover (10) being assisted by means of a locking mechanism by pressing the release button (11), which prevents the accidental opening of said cover, as it happens in the conventional terminals.

In addition, it is anticipated that the device incorporates a high-resolution image scanner (12), of 1.3 MPx or higher, which enables the capture of images, as well as reading one and two dimension codes.

Regarding the means for reading banking cards (7), it is provided that a magnetic stripe card reader (13), a chip card or "smart card" reader (14), as well as a RFID reader (15), EMV and PCI compatible, are integrated therein.

The microprocessor (1) is associated to an audio circuit (16), with software of the "text to speech" type, i.e., through which the operations carried out with the device become voice messages that are emitted through one or more speakers (17), likewise having a microphone (18), as well as the corresponding headphones inlet.

In regard to the communication module (3), it is envisaged that the following communication and positioning sub-modules are located therein:

Quadband GSM/GPRS (21), with built-in antenna in the terminal
Connector for external antenna (22)
WIFI (23)
GPS (24)
Bluetooth (25)
Lan Ethernet (27)

Additionally, the device has two mini USB ports (32) on a lateral of its case.

In regard to the external appearance of the terminal, it has been provided that its case (26) incorporates rubber reinforcements in correspondence with its vertexes, incorporating a pair of end parts (29), which are secured by screwing them to the case, endowed with elongated slots (30) to which a tape (31) functioning as an attachment element for the device is fixed.

In its lower face it also incorporates a large space in which a pack of high performance batteries (28) is placed.

The device thus described presents a reduced volumetry, with a weight around 805 grams, that allows storing a paper roll up to 15 meters long, with a high performance battery (4 AH), and a last generation microcomputer processor, with a RAM memory (19) of 512 Mb and a storage memory (20) of 4 GB.

The invention claimed is:

1. A multi-communications assisted portable point of sale (POS) terminal configured to carry out POS operations by a user with physical disabilities comprising:
a case, wherein the case includes a lower face, the lower face comprising a pair of end parts, each end part secured by screws to the lower face of the case, the end parts comprising an elongated slot in each of the end parts, the pair of end parts further comprising rubber reinforcements positioned to protect the terminal from impacts;
an external tape fixed to and extending between each of the elongated slots, the external tape used to secure the POS terminal to the user;
a microprocessor, a power supply, a communication module, a keypad, a screen, a printer, a banking card reader, a joystick, contextual operation keys, a built-in antenna, connectors for a USB port, an external antenna, a wireless local area network (WIFI), a global position system (GPS), an Ethernet port, a Bluetooth transceiver, an image scanner of 1.3 MPx, an audio circuit, a microphone, and a speaker, all housed by the case, wherein:
the screen is a touch screen,
the keypad is a numerical keyboard with Braille reliefs, the keypad being separate from the screen,
the joystick is configured for navigation and located below the screen and above the keypad,
the contextual operation keys are located above the keypad and to each lateral side of the joystick,
the banking card reader integrates each of i) a magnetic stripe card reader, ii) a chip card reader to read smart cards, and iii) a near field communication (NFC, RFID) card reader, the banking card reader being Europay, MasterCard and Visa standard (EMV) and payment card industry security standard (PCI) compliant,
the communication module supports Quadband Global System for Mobile Communications (GSM) and General Packet Radio Service (GPRS),
the microprocessor is configured to convert the POS operations into voice messages emitted through the speaker to the user, and
the microphone is coupled to the processor for converting the user's voice into POS transaction operations.

2. The multi-communication assisted portable terminal, according to claim 1, wherein, the printer accepts 58 and 80 mm wide roll paper printer, the printer is configured to print European Article Number 128 (EAN) twenty eight digit codes, the printer includes a cover with a locking mechanism comprising a release button of said cover, the release button operable by pressing.

3. The multi-communication assisted portable terminal, according to claim 1, wherein the audio circuit comprises a microphone.

4. The multi-communication assisted portable terminal, according to claim 1, wherein, further comprising: the battery is a high performance battery of four amp hours (4 AH), and wherein the microprocessor is connected to i) random access memory (RAM) and ii) a flash storage memory.

5. The multi-communication assisted portable terminal, according to claim 1, wherein, the case includes a lower face providing access to a space storing the battery, and the portable terminal further comprises a high performance battery of four amp hours (4 AH).

6. multi-communication assisted portable terminal, according to claim 1, wherein a total weight of the terminal is around 805 grams.

* * * * *

UNITED STATES PATENT AND TRADEMARK OFFICE
CERTIFICATE OF CORRECTION

PATENT NO. : 8,561,884 B2  
APPLICATION NO. : 13/588143  
DATED : October 22, 2013  
INVENTOR(S) : Antonio Jimenez Alamo Page 1 of 1

It is certified that error appears in the above-identified patent and that said Letters Patent is hereby corrected as shown below:

On the Title Page, Item (73) should read,

(73) Assignees: Intelligent Data, S.L. (ES);
Sociedad Anonima Espanola de Tarjetas de Identificacion y Credito (ES)

Signed and Sealed this
Twenty-fifth Day of February, 2014

Michelle K. Lee
*Deputy Director of the United States Patent and Trademark Office*